US012115809B2

(12) United States Patent
Michenaud

(10) Patent No.: US 12,115,809 B2
(45) Date of Patent: Oct. 15, 2024

(54) WRITING INSTRUMENTS

(71) Applicant: Société BIC, Clichy (FR)

(72) Inventor: Etienne Michenaud, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/258,003

(22) PCT Filed: Dec. 2, 2021

(86) PCT No.: PCT/EP2021/084006
§ 371 (c)(1),
(2) Date: Jun. 16, 2023

(87) PCT Pub. No.: WO2022/128513
PCT Pub. Date: Jun. 23, 2022

(65) Prior Publication Data
US 2024/0051330 A1 Feb. 15, 2024

(30) Foreign Application Priority Data
Dec. 17, 2020 (EP) .................................... 20306594

(51) Int. Cl.
*B43K 24/14* (2006.01)
*B43K 24/10* (2006.01)

(52) U.S. Cl.
CPC .............. *B43K 24/14* (2013.01); *B43K 24/10* (2013.01); *B43K 24/146* (2013.01)

(58) Field of Classification Search
CPC ........ B43K 24/14; B43K 24/00; B43K 24/10; B43K 24/146; B43K 24/16; B43K 24/12
USPC ........................................ 401/29, 30, 32, 33
See application file for complete search history.

(56) References Cited

U.S. PATENT DOCUMENTS

| | | | | | |
|---|---|---|---|---|---|
| 3,225,746 | A | 12/1965 | Emil | | |
| 4,283,151 | A | 8/1981 | Sekiguchi | | |
| 5,713,680 | A | 2/1998 | Yoshino et al. | | |
| 6,939,069 | B2 | 9/2005 | Odaka | | |
| 6,994,484 | B2 | 2/2006 | Kageyama et al. | | |
| 2005/0063767 | A1 * | 3/2005 | Kobayashi ............... | B43K 7/03 | 401/32 |
| 2012/0315074 | A1 * | 12/2012 | Roberts .................. | B43K 24/14 | 401/32 |

(Continued)

FOREIGN PATENT DOCUMENTS

WO 2019202120 A1 10/2019

OTHER PUBLICATIONS

International Search Report and Written Opinion issued in PCT/EP2021/084006, mailed on Mar. 10, 2023.

*Primary Examiner* — David J Walczak
(74) *Attorney, Agent, or Firm* — Bookoff McAndrews, PLLC

(57) ABSTRACT

A multifunction writing instrument comprising a body extending along an axis and receiving at least two writing elements, each writing element comprising a writing tip and being movable between a protruded position in which the writing tip extends out of the body and a retracted position in which the writing tip is retracted within the body, and an actuating mechanism comprising a spinner configured to move one of the writing elements at a time, one after the other, from the retracted position to the protruded position, a ratchet receiving the spinner, and a single button configured to actuate the actuating mechanism.

18 Claims, 6 Drawing Sheets

(56) References Cited

U.S. PATENT DOCUMENTS

| | | | |
|---|---|---|---|
| 2019/0344602 | A1 | 11/2019 | Sawayama |
| 2020/0238749 | A1 | 7/2020 | Vadenne et al. |

* cited by examiner

WRITING INSTRUMENTS

This is a National Stage Application under 35 U.S.C. § 371 of International Application No. PCT/EP2021/084006, filed Dec. 2, 2021, now published as WO 2022/128513 A1, which claims priority to European Patent Application No. 20306594.1, filed on Dec. 17, 2020, the entirety of '594.1 application being incorporated herein by reference.

TECHNICAL FIELD

The present disclosure relates to a multifunction writing instrument. A multifunction writing instrument is a writing instrument comprising a plurality of writing elements, each writing element being selectively usable.

BACKGROUND

Traditional multifunction writing instruments usually includes several buttons, each button being configured to actuate a single writing element. This may be not fully easy to use. In addition, the presence of several buttons requires space, which increases the size of the writing instrument and may render its use not easy/pleasant. Therefore, a need exists to provide an improved user friendly multifunction writing instrument.

SUMMARY

An embodiment relates to a multifunction writing instrument comprising a body extending along an axis and receiving at least two writing elements, each writing element comprising a writing tip and being movable between a protruded position in which the writing tip extends out of the body (i.e. configured to be used for writing or the like) and a retracted position in which the writing tip is retracted within the body, and an actuating mechanism comprising a spinner configured to move one of the writing elements at a time, one after the other, from the retracted position to the protruded position, a ratchet receiving the spinner, and a single button configured to actuate the actuating mechanism In the following, and unless otherwise specified, "writing instrument" should be understood as "multifunction writing instrument".

The writing instrument may present two or more writing elements. In the following, and unless otherwise specified, "writing elements" should be understood as "at least two writing elements".

A writing element may be formed by any element comprising a writing tip. For example, the writing tip may be a felt tip, a ballpoint or other point, a graphite lead, a mechanical pencil lead, a chalk, any other means suitable for writing on a substrate, or an (active or passive) endpiece configured to co-operate with a touch screen, e.g. a capacitive, resistive, inductive, infrared, optical, electrostatic, etc. screen. For example, if the writing element comprises a ballpoint, it may also comprise an ink reservoir. In another example, if the writing element comprises a mechanical pencil, it may also comprise a lead propelling mechanism and a lead reservoir. Below, and unless otherwise specified, it is assumed that the writing tip of any writing element is carried by a writing head, and the writing tip may be stationary (e.g. a ballpoint) or movable (e.g. a mechanical pencil lead) relative to the writing head.

The body may be hollow and configured to receive the writing elements. The body may thus present an inside and an outside.

In the following, and unless otherwise specified, "button" should be understood as "the single button". The button may be a knocking or pressing or pushing button.

The actuating mechanism may cooperate/interact directly or indirectly with the writing elements.

The spinner and the ratchet are configured to cooperate/interact with each other so that, when the actuating mechanism is actuated, the spinner may rotate and move axially in order to engage/disengage with stop portions of the ratchet.

The actuating mechanism may be actuated by the button. Therefore, it may only be needed to actuate the button for the actuation of the actuating mechanism and for moving a writing element from the retracted position to the protruded position. Such an actuation may actuate the spinner, which then may move a writing element from the retracted position to the protruded position.

The spinner is configured to move one of the writing elements at a time, one after the other, from the retracted position to the protruded position. In other words, the spinner is configured to move a single writing element at a time, in a row. When one writing element has been moved from the retracted position to the protruded position, and then after from the protruded position to the retracted position, then another writing instrument may be moved by the spinner from the retracted position to the protruded position, etc. In other words, the spinner is configured to move sequentially the writing elements from the retracted position to the protruded position, and one at a time. A writing instrument in the protruded position may be moved from the protruded position to the retracted position, for example in response to an actuation of the actuating mechanism or of another system, for example with the help of a return mechanism.

For example, if the writing instrument comprises two writing elements, when actuated, the spinner may move first one of the two writing elements from the retracted to the protruded position. In another actuation, the spinner may move the other of the two writing elements from the retracted to the protruded position. In still another actuation, the spinner may move again the one of the two writing elements from the retracted to the protruded position, etc. For example, if the writing instrument comprises three writing elements, i.e. a first, a second and a third writing element, the first one may be moved first from the retracted to the protruded position, the second one may be moved after, from the retracted to the protruded position, and the third one may be moved from the retracted to the protruded position thereafter. At the end on the sequence, the first writing element may be moved again from the retracted to the protruded position. Broadly, if the writing instrument comprises N writing elements (N being a positive integer), the spinner is configured to move sequentially and one after the other, the N writing elements from the retracted position to the protruded position, starting from the first, up to the $N^{th}$ writing elements, and then starting again from the first, etc.

The actuating mechanism may require only a reduced space, which may allow a size reduction of the writing instrument. The actuation of the writing elements by a single button may be considered as particularly easy for the user.

In embodiments, the actuating mechanism may be configured to move a writing instrument from the retracted position to the protruded position only if all the writing elements are in the retracted position.

In embodiments, the spinner may comprise a distal end forming a helical cam surface configured to push one of the writing elements at a time, one after the other, from the retracted position to the protruded position.

In the present disclosure, any surface extending axially and circumferentially (not necessarily along a complete loop of 360°), and configured to cause an axial/rotational movement in response to a rotational/axial movement, respectively, is considered as a helical cam surface.

For example, the helical cam surface may extend all around the circumference of the spinner, and may be looped on itself. The helical cam surface may be regular. The helical cam surface may extend in a single plane, and may have an elliptic shape in said plane.

When rotating, the spinner may move a single writing element from the retracted position to the protruded position, via its distal end forming a helical cam surface. The spinner may cooperate/interact directly or indirectly with the writing elements.

In embodiments, the actuating mechanism may comprise a protruding mechanism and a blocking mechanism which is distinct from the protruding mechanism, the protruding mechanism comprising the spinner and the ratchet.

The protruding mechanism may be configured to move, directly or indirectly, the writing elements from the retracted position to the protruded position. The blocking mechanism may be configured to block, directly or indirectly, a writing element in the protruded position. For example, the blocking mechanism may block the protruding mechanism when a writing element is in the protruded position.

In embodiments, the blocking mechanism may be functionally disposed between the single button and the protruding mechanism.

In embodiments, the protruding mechanism may be functionally disposed between the blocking mechanism and the writing elements.

By "functionally disposed between" it is meant that an input of the blocking mechanism cooperates/interacts (directly or indirectly) with the button and that an output of the blocking mechanism cooperates/interacts (directly or indirectly) with an input of the protruding mechanism. In the same way, it is meant that an output of the protruding mechanism cooperates/interacts (directly or indirectly) with an input of writing elements. For example, a distal end forming a helical cam surface of the spinner may form and output of the protruding mechanism.

The blocking mechanism may by physically disposed between the button and the protruding mechanism, but not necessarily.

The protruding mechanism may be physically disposed between the protruding mechanism and the writing elements, but not necessarily.

From the functions point of view, the button, the blocking mechanism, the protruding mechanism and the writing elements may be disposed in series with regard to each other, while the writing elements may be disposed in parallel with regard to each other.

In embodiments, the spinner may be functionally connected to the blocking mechanism.

A portion of the spinner may form an input of the protruding mechanism. In other words, the spinner and the blocking mechanism may cooperate/interact via any means. The spinner and the blocking mechanism may be functionally connected by any means, and are not necessarily physically linked/coupled to each other. For example, the spinner and the blocking mechanism may cooperate directly or indirectly, for example by abutment.

In embodiments, the spinner may comprise two cam followers diametrically opposed.

In embodiments, the ratchet may comprise two opposite helical cam surfaces axially sandwiching at least one cam follower of the spinner.

The two opposite helical cam surfaces may cause the spinner to rotate when the spinner and the two opposite helical cam surfaces are axially moved, in any axial directions, relatively to each other. The two opposite helical cam surfaces may comprise at least one stop portion configured to stop the rotation of the spinner and to block the spinner in a predetermined circumferential/angular position.

The two opposite helical cam surfaces may extend all along a circumference around the axis. Each helical cam surface of the two opposite helical cam surfaces may be looped on itself.

In embodiments, the at least one cam follower may have a trapezoidal shape, the two parallel sides of the trapezoidal shape extending axially, and the two oblique sides of the trapezoidal shape respectively extending parallel to oblique portions of the two opposite helical cam surfaces.

In embodiments, the body may comprise a first part and a second part, the first part may include one of the two opposite helical cam surfaces and the second part may include the other of the two opposite helical cam surfaces.

In embodiments, the blocking mechanism may be a ratchet mechanism comprising a second spinner, a second ratchet receiving the second spinner, and a piston configured to be actuated by the single button.

The spinner (or first spinner) and the second spinner may be distinct from each other. The ratchet (or first ratchet) and the second ratchet may be distinct from each other. The piston and the button may form together a same and single part/piece, but not necessarily. The piston may be configured to axially push the second spinner, while the second spinner may be configured to axially and rotatably cooperate/interact with the second ratchet.

In embodiments, the spinner and the second spinner may be configured to axially abut against each other.

A portion of the spinner may form the input of the protruding mechanism. A portion of the second spinner may form the output of the blocking mechanism. The spinner and the second spinner may directly or indirectly abut against each other.

In embodiments, the actuating mechanism may be a ratchet mechanism including only the spinner, the ratchet and the single button.

The button may cooperate/interact directly or indirectly with the spinner.

In embodiments, each of the writing instruments may comprise a return spring configured to push the writing instrument from the protruded position toward the retracted position, the return springs of the writing instruments serving as return springs for the actuating mechanism.

For example, when the return spring of a writing element which is in the protruded position move the writing element from the protruded position to the retracted position (for example when the blocking mechanism is released), the writing element may simultaneously cooperate/interact with the protruding mechanism, which is thus returned in a configuration able to move a writing element from the retracted position to the protruded position at the next actuation of the actuating mechanism.

The actuating mechanisms of the present disclosure may require only a reduced space, which may allow a size reduction of the writing instrument. The actuation of the multifunction writing elements of the present disclosure by a single button may be considered as particularly easy for the user.

BRIEF DESCRIPTION OF THE DRAWINGS

The disclosure and its advantages can be better understood by reading the detailed description of various embodiments given as non-limiting examples. The description refers to the accompanying sheets of figures, in which.

DETAILED DESCRIPTION

Figure 1:
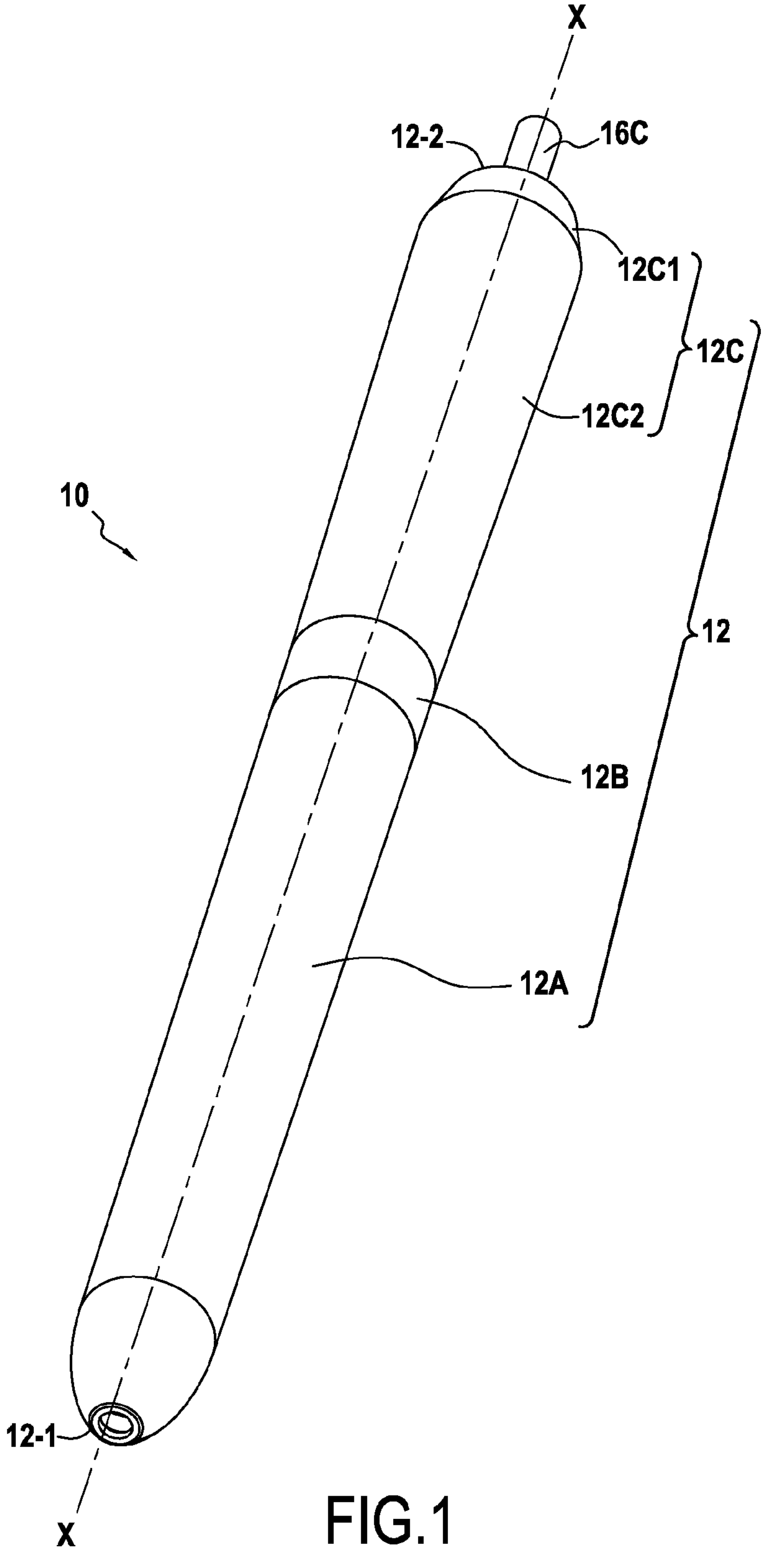
FIG. 1 shows a multifunction writing instrument.
Figure 2:
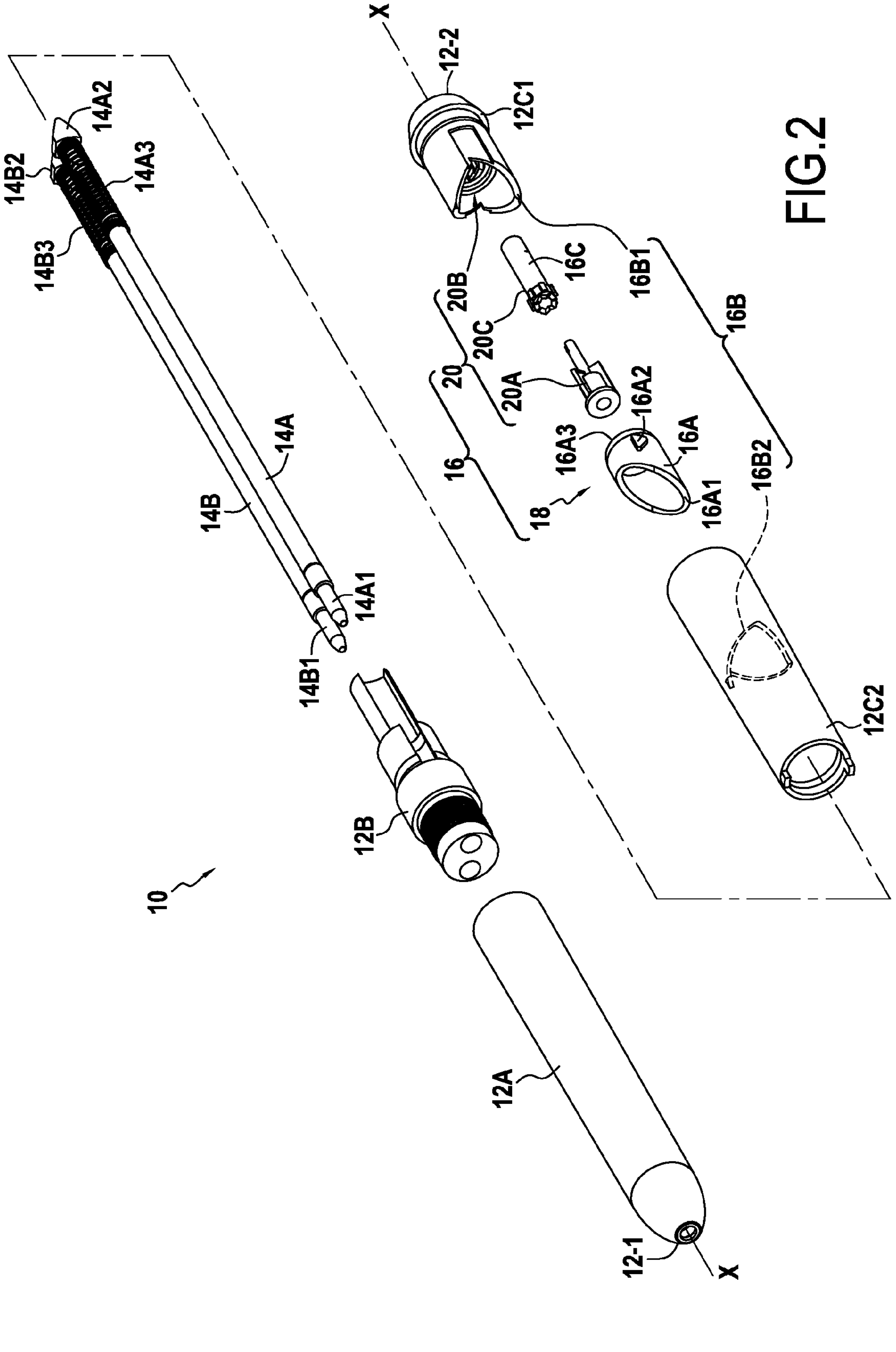
FIG. 2 shows an exploded view of the multifunction writing instrument of FIG. 1.

FIGS. 1 and 2 show an embodiment of a multifunction writing instrument 10. The writing instrument 10 comprises a body 12 extending along an axis X. The body 12 has a front end (or first end) 12-1 and a rear end (or second end) 12-2 opposed to the front end 12-1 along the axis X.

The body 12 may comprise a front portion 12A comprising the front end 12-1, an intermediate portion 12B and a rear portion 12C comprising the rear end 12-2. The intermediate portion 12B may be axially disposed between the front portion 12A and the rear portion 12C. The rear portion 12C may comprise a first part 12C1 and a second part 12C2. The first part 12C1 may comprise the rear end 12-2. The front portion 12A and the intermediate portion 12B may be fixed (i.e. coupled in translation and in rotation) together, for example via a screw system. The first part 12C1 and the second part 12C2 may be fixed together, for example via a snap fitting system. The rear portion 12C and the intermediate portion 12B may be fixed together, for example via a snap fitting system. For example, the second part 12C2 may be fixed with the intermediate portion 12B.

The body 12 may house two writing elements 14A and 14B, each of which being provided with a writing tip 14A1, 14B1, respectively. Each writing element 14A, 14B may be a ballpoint element (i.e. the writing tips may be ballpoint tips), and provided with different ink colour. In a variant, the writing instrument may have more than two writing elements. In another variant, the writing elements may be different (i.e. the tips may be of a different type). The writing elements 14A and 14B may be arranged at 180° relative to each other around the axis X (i.e. diametrically opposed within the writing instrument 10). Each of the writing element 14A, 14B is movable between a protruded position in which the writing tip 14A1, 14B1 extends out of the body 12, and a retracted position in which the writing tip 14A1, 14B1 is retracted within the body 12. In FIG. 1, the two writing elements 14A and 14B are in the retracted position. The intermediate portion 12B may be configured to bear and to axially guide the writing elements 14A, 14B.

The writing element 10 comprises an actuating mechanism 16 comprising a spinner 16A configured to move one of the writing elements 14A, 14B at a time, one after the other, from the retracted position to the protruded position, a ratchet 16B receiving the spinner 16A, and a single button 16C configured to actuate the actuating mechanism 16. The button 16C may be knocking (or pressing or pushing) button.

The button 16C may be a rear button, extending axially from the rear end 12-2 of the body 12. In a variant not shown, the button may be a lateral button, extending radially from the body 12.

The spinner 16A may comprise a distal end 16A1 forming a helical cam surface configured to push one of the writing elements 14A, 14B at a time, one after the other, from the retracted position to the protruded position. Each of the writing instruments 14A, 14B may comprise a cam follower 14A2, 14B2, configure to axially abut against the distal end 16A1. The writing instruments 14A, 14B may be in their respective retracted or protruded position, depending on the angular position of the spinner 16A. Each of the writing instruments 14A, 14B may comprise a return spring 14A3, 14B3, respectively, configured to push the writing instrument 14A, 14B from the protruded position toward the retracted position. The return springs 14A3, 14B3 of the writing instruments 14A, 14B, may serve as return springs for the actuating mechanism 16. The return springs 14A3, 14B3 may be compression helical springs, and may each have a first axial end abutting against the intermediate portion 12B and a second axial end, opposed along the axis X to the first axial end, abutting against the cam followers 14A2, 14B2, respectively.

The spinner 16A may comprise at least one cam follower 16A2 configured to cooperate with the ratchet 16B. In the present example, the spinner 16A may comprise two cam followers 16A2 diametrically opposed. When the spinner 16A is axially pushed, for example in response to an actuation of the button 16C, or due to the action of the return spring 14A3, 14B3, the spinners 16A may rotate around the axis X, due to the interaction between the cam followers 16A2 and the ratchet 16B.

The ratchet 16B may comprise two opposite helical cam surfaces 16B1, 16B2 axially sandwiching the at least one cam follower 16A2 of the spinner 16A. The first part 12C1 may include the helical cam surface 16B1. The second part 12C2 may include the helical cam surface 16B2. Each of the two opposite helical cam surfaces 16B1, 16B2 may form an axial shoulder against which the cam followers 16A2 are configured to axially abut and rotatably slide.

Figure 3:
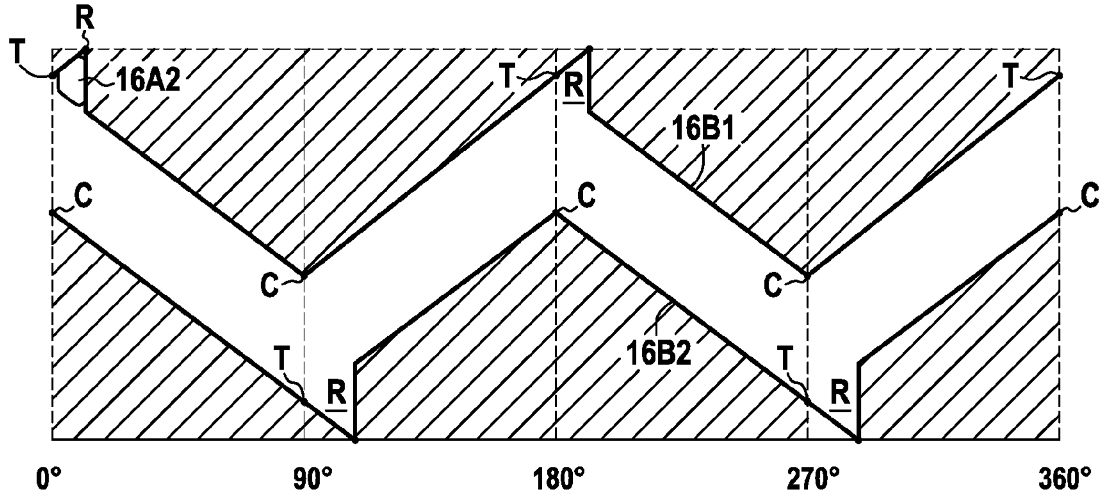
FIG. 3 shows a developed view of two opposite helical cam surfaces of the ratchet of the multifunction writing instrument of FIG. 1.

FIG. 3 shows a developed view of the two opposite helical cam surfaces 16B1, 16B2, only one cam follower 16A2 being shown sandwiched between the two opposite helical cam surfaces 16B1 and 16B2. Each cam surface 16B1 and 16B2 may have a periodical shape, and may have a period of 180°. In the case where the writing mechanism 10 would have N writing elements (N being a positive integer), the period of each of the two opposite helical cam surfaces may be 360°/N.

In the developed view, each period of the two opposite helical cam surfaces 16131, 16132 may have a substantially sawtooth waveform with a further recess R disposed immediately after the trough T. The recess R may be configured to receive at least in part the cam follower 16A2, and to stop the rotational movement of the cam follower 16A2 along the cam surface on which the cam follower 16A2 axially abuts and is guided in rotation. The recesses R may form stop portions of the two opposite helical cam surfaces 16131, 16132. The recess R and the cam follower 16A2 may be configured to cooperate in form-fitting manner. The two opposite helical cam surfaces 16131, 16132 may be phase-synchronized. The troughs T of one of two opposite helical cam surfaces 16131, 16132 may have the same angular position as the crests C of the other of two opposite helical cam surfaces 16131, 1662. The recesses R of one cam surface 16131, 16132 may be immediately disposed after the crests C of the other cam surface 16131, 16132, respectively.

The cam followers 16A2 may have a trapezoidal shape, the two parallel sides of the trapezoidal shape extending axially, and the two oblique sides of the trapezoidal shape respectively extending parallel to the portions of the two opposite helical cam surfaces 16131, 16132 leading to the recess R. The trapezoidal shape of the cam followers may serve for an efficient stop inside the recess R.

The actuating mechanism 16 may comprise a protruding mechanism 18 and a blocking mechanism 20 which is distinct from the protruding mechanism 18, the protruding mechanism 18 comprising the spinner 16A and the ratchet 16B. The blocking mechanism 20 may be functionally disposed between the single button 16C and the protruding mechanism 18 and the protruding mechanism 18 may be functionally disposed between the blocking mechanism 20 and the writing elements 14A, 14B. The spinner 16A may be functionally connected to the blocking mechanism 20.

The blocking mechanism 20 may be a ratchet mechanism comprising a second spinner 20A, a second ratchet 20B receiving the second spinner 20A, and a piston 20C configured to be actuated by the single button 16C. The piston 20C and the button 16C may be formed unitary (i.e. may form a same and single piece). The first part 12C1 may include the second ratchet 20B. The ratchet mechanism forming the blocking mechanism 20 is well known as such by the skilled person, and neither its structure nor its operation is disclosed with more details. In response to the actuation of the button 16C, the second spinner 20A axially move between a releasing position and blocking position, the second spinner 20A being closer to the rear end 12-2 in the releasing position than in the blocking position. In other words, the second spinner 20A is closer to the front end 12-1 in the blocking position than in the releasing position. After being moved between the releasing position and the blocking position, the second spinner 20A is blocked in its position, up to the next actuation of the button 16C.

The spinner 16A and the second spinner 20A may be configured to axially abut against each other.

In the present example, the piston 20C may form an input of the blocking mechanism 20, from the button 16C and the second spinner 20A may form an output of the blocking mechanism 20 toward the protruding mechanism 18. The spinner 16A, or a portion of the spinner 16A, for example a shoulder 16A3 facing the second spinner 20A, may form an input of the protruding mechanism 18 from the blocking mechanism 20. The spinner 16A, or another portion of the spinner 16A, for example the distal end 16A1, may form an output of the protruding mechanism 18, toward the writing instrument 14A, 14B.

FIGS. 4A to 4H and 5A to 5H show the interaction between the spinner 16A, the ratchet 16B and the writing elements 14A, 14B, when the actuating mechanism 16 is actuated. FIGS. 4A to 4H are side views showing only, for clarity, the spinner 16A, the two opposite helical cam surfaces 16131, 16132 of the ratchet 16B, and the cam followers 14A2, 14132 of the writing elements 14A, 14B. FIGS. 5A to 5H respectively correspond to the configuration shown in FIGS. 4A to 4H, and show, for clarity, the position of a single cam follower 16A2 of the spinner 16A with regard to the two opposite helical cam surfaces 16131, 1662 of the ratchet 16B, in a developed view. The description applies for the two cam followers 16A2, which are diametrically opposed, and each disposed in one of the two periods of the two opposite helical cam surfaces 16131, 16132, in the same relative position with regard to said period. The angular reference point (i.e. 0° point) in the developed views is arbitrary and may be otherwise chosen, and is only indicated to improve clarity.

Figure 4A:
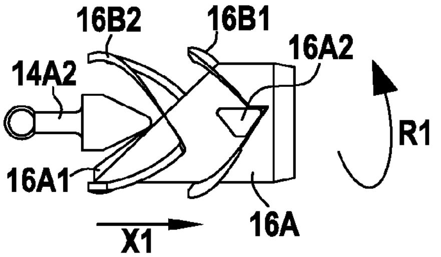
FIG. 4A to 4H shows the interaction between the spinner and the ratchet when actuating the actuating mechanism.
Figure 5A:
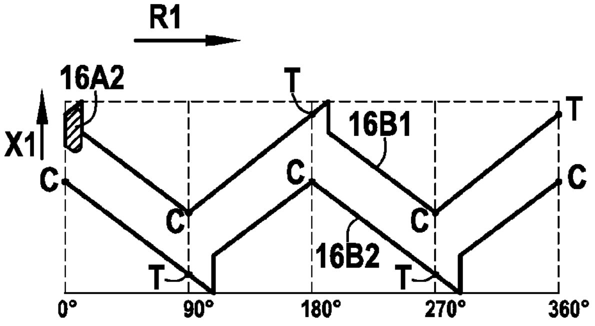
FIG. 5A to 5H shows a developed view of the interaction between the spinner and the ratchet when actuating the actuating mechanism.

FIGS. 4A and 5A corresponds to a configuration wherein the two writing elements 14A and 14B are in the retracted position. The cam follower 16A2 is axially pushed by the return springs 14A3, 1463, via the cam followers 14A2 and 14132 which axially abut against the cam surface 16A1 of the spinner 16A, toward the rear end 12-2, and is blocked within a recess R of the helical cam surface 1661. The cam follower 16A2 abuts in the axial direction X1 and in the rotational direction R1 against and the stop portion (or abutment) formed by the recess R, and is axially and rotatably blocked. The spinner 16A is thus axially and rotatably blocked.

Figure 4B:
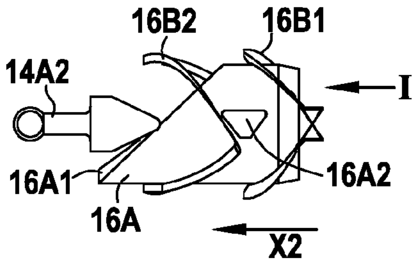
Figure 5B:
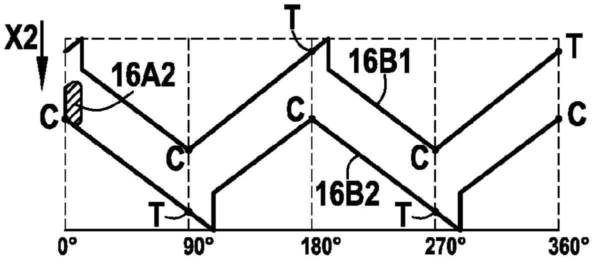

FIGS. 4B and 5B show a first step of an actuation of the button 16C (not shown), which is pressed toward the front end 12-1, as shown by the arrow I. This axially moves in the same axial direction X2 (opposed to the axial direction X1), the piston 20C and the second spinner 20A (not shown), which drives the spinner 16A in the same direction X2 up to abut against the helical cam surfaces 16132, via the cam follower 16A2, between a crest C and a trough T.

Figure 4C:
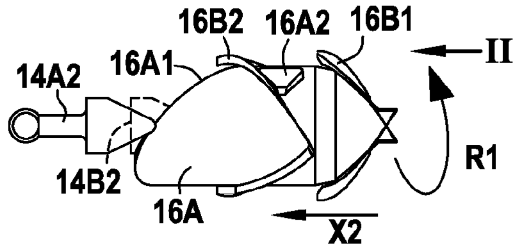
Figure 5C:
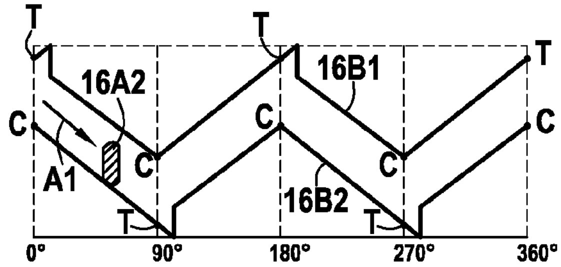

FIGS. 4C and 5C show a second step of the actuation of the button 16C (not shown), which is further pressed toward the front end 12-1, as shown by the arrow II. This further axially moves the spinner 16A in the axial direction X2. As a consequence, the cam follower 16A2, and thus the spinner 16A, is moved in rotation in the rotational direction R1 along the helical cam surface 16132, toward the trough T of the helical cam surface 16132. The resulting global movement is shown by arrow A1 in FIG. 5C. The cam surface 16A1 of the spinner 16A thus axially pushes the cam follower 14A2 of the writing element 14A, which is moved toward its protruded position. Simultaneously, due to the return spring 1463, the writing element 14B follows the cam surface 16A1 and further moved toward the rear end 12-2. The detent of the return spring 14133 may assist the movement of the spinner 16A and the compression of the return spring 14A3.

Figure 4D:
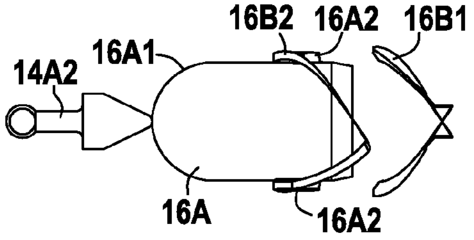
Figure 5D:
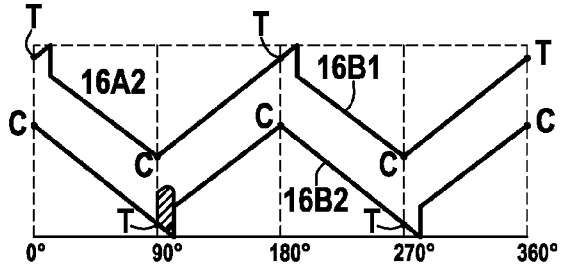

FIGS. 4D and 5D show the end of the second step of the actuation of the button 16C, the cam follower 16A2 being received and blocked by the recess R of the helical cam surfaces 16132. The strike of the button 16C is ended, and the button 16C cannot be further pushed toward the front end 12-1. The pressure against the button 16C may thus be released.

Figure 4E:
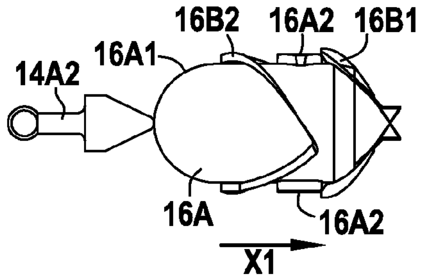
Figure 5E:
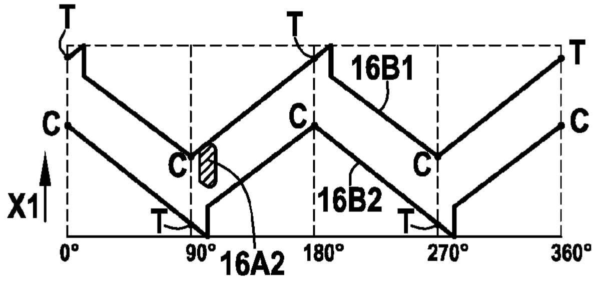

FIGS. 4E and 5E show the final position of the spinner 16A, the pressure against the button 16C being released, and the return springs 14A3 and 14133 acting as returns springs for the actuating mechanism 16, pushing all the elements toward the rear end 12-2 along the axial direction X1. With regard to the position shown in FIGS. 4D and 5D, the spinner 16A is only moved along the axial direction X1 (toward the rear end 12-2) of a distance corresponding to the axial gap of the blocking mechanism 20 for axially blocking the second spinner 20A in the second ratchet 20B. Such a gap may be lower than or equal to the axial distance between the two opposite helical cam surfaces 1661, 16132. The second spinner 20A is thus in the blocking position and axially blocks the spinner 16A in the axial direction X1. In other words, during the actuation from FIGS. 4A/5A to the FIGS. 4E/5E, the blocking mechanism 20 has also been actuated, and the second spinner 20A has been moved from the releasing position to the blocking position (which is axially further toward the front end 12-1 with regard to the releasing position). In the configuration of FIGS. 4E and 5E, the writing element 14A is blocked in the protruding position and the writing element 14B is blocked in the retracted position. In the frame of the present disclosure, any axial position of a writing element wherein the writing tip remains concealed or retracted within the body 12 is considered as a retracted position. Therefore, during the movements from FIGS. 4A/5A to FIGS. 4E/5E, the writing element 14B is considered as staying in the retracted position.

FIGS. 4E and 5E correspond to a configuration resulting from a single actuation/stroke of the button 16C, from the configuration shown in FIGS. 4A/5A. From the configuration shown in FIGS. 4A and 5A, the spinner 16A has been rotated of 90° around the axis X in the rotational direction R1. The movement of the writing element 14A, driven from the retracted position to the protruded position, results from the sum of an axial movement along direction X2 of the spinner 16A and of an axial movement due to the helical cam 16A1 resulting from the rotation of the spinner 16A. In FIGS. 4E and 5E, with regard to the position shown in FIGS. 4A and 5A, the cam follower 16A2 has passed the trough T of the helical cam surfaces 16132, the crest C of the helical cam surfaces 1661.

Figure 4F:
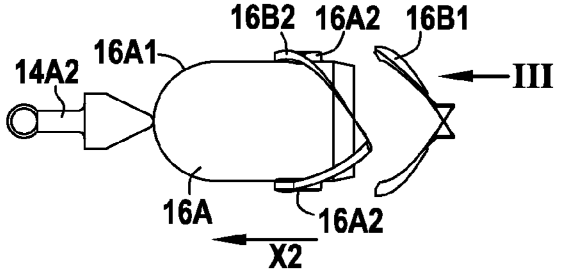
Figure 5F:
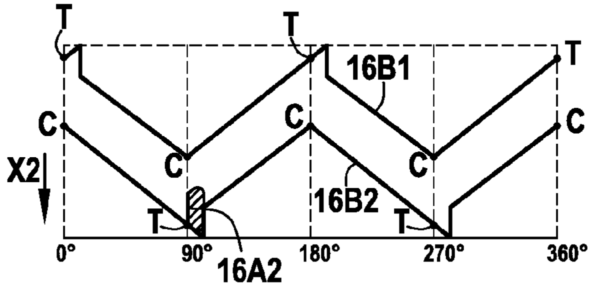

FIGS. 4F and 5F show an actuation of the button 16C (not shown), which is pressed toward the front end 12-1, as shown by the arrow III, starting from the configuration of FIGS. 4E and 5E wherein the writing element 14A is in the protruded position. The actuation of the button 16C actuates the blocking mechanism 20, due to which the second spinner 20A axially pushed the spinner 16A toward the front end 12-1. The second spinner 20A of the blocking mechanism is now ready to move from the blocking position toward the releasing position.

Figure 4G:
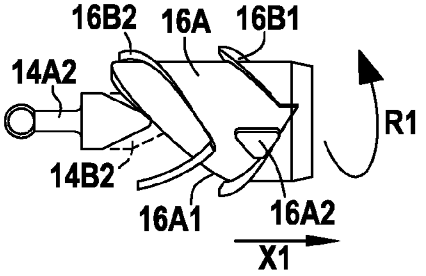
Figure 5G:
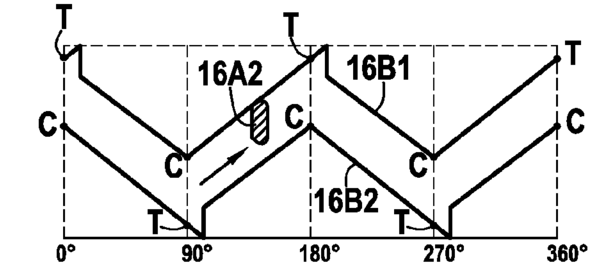

FIGS. 4G and 5G show a step wherein the pressure on the button 16C is released. The return springs 14A3 and 14B3 act as returns springs for the actuating mechanism 16, and push the spinner 16A toward the rear end 12-2, which abut against the helical cam surfaces 16B1, between a crest C and a trough T. As a consequence, the cam follower 16A2, and thus the spinner 16A, is moved in rotation in the rotational direction R1 along the helical cam surface 16B1, toward the trough T of the helical cam surface 16B1. The resulting global movement is shown by the arrow A2 in FIG. 5G. The cam surface 16A1 of the spinner 16A thus allows axial movement of the cam follower 14A2 of the writing element 14A toward the rear end 12-2. Simultaneously, the writing element 14B follows the cam surface 16A1 and is moved toward the front end 12-1, but remain concealed within the body 12. The detent of the return spring 14A3 may provide higher force than necessary to compress the return spring 14B3.

Figure 4H:
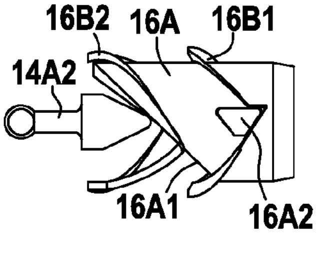
Figure 5H:
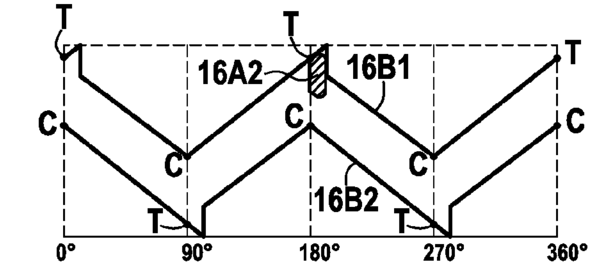

FIGS. 4H and 5H show the final position of the spinner 16A, the cam follower 16A2 being received and blocked by the recess R of the helical cam surfaces 16B1 (similarly to which has been disclosed with reference to FIGS. 4A and 5A). The writing element 14A (as well as the writing element 14B) is in the retracted position. The cam follower 16A2 has passed the trough T of the helical cam surfaces 16B1, the crest C of the helical cam surfaces 16B2. From the configuration shown in FIGS. 4E and 5E, the spinner 16A has been rotated of 90° around the axis X, in the rotational direction R1. From the configuration shown in FIGS. 4A and 5A, the spinner 16A has been rotated of 180° around the axis X in the rotational direction R1. FIGS. 4H and 5H correspond to a configuration resulting from a single actuation/stroke of the button 16C (from the configuration shown in FIGS. 4E/5E).

From the configuration of FIGS. 4H and 5H, the next actuation of the button 16C moves the writing element 14B from the retracted position to the protruded position, similarly to what explained with reference to FIGS. 4A/5A to FIGS. 4E/5E. From the configuration shown in FIGS. 4H and 5H, the spinner 16A has been rotate of 90° around the axis X, in the rotational direction R1. From the configuration shown in FIGS. 4A and 5A, the spinner 16A has been rotated of 270° around the axis X in the rotational direction R1. From the latter configuration (not shown), the next actuation of the button 16C moves the writing element 14B from the protruded position to the retracted position, similarly to what explained with reference to FIGS. 4E/5E to FIGS. 4H/5H. From the latter configuration (not shown), the spinner 16A has been rotated of 90° around the axis X, in the rotational direction R1. From the configuration shown in FIGS. 4A and 5A, the spinner 16A has been rotated of 360° around the axis X in the rotational direction R1, and the configuration is the same as the one shown in FIGS. 4A and 5A.

Successive actuations of the actuating mechanism 16 may move one of the writing elements at a time, one after the other, between the retracted and the protruded position. The actuating mechanism 16 may be configured to move a writing instrument 14A, 14B from the retracted position to the protruded position only if all the writing elements 14A, 14B are in the retracted position. A first actuation of the button 16C may move one of the two writing elements 14A, 14B from the retracted position to the protruded position, a second actuation of the button 16C may move the one of the two writing elements 14A, 14B from the protruded position to the retracted position, a third actuation of the button 16C may move the other of the two writing elements 14A, 14B from the retracted position to the protruded position, and a fourth actuation of the button 16C may move the other of the two writing elements 14A, 14B from the protruded position to the retracted position. A fifth actuation may start again the same sequence.

Figure 6:
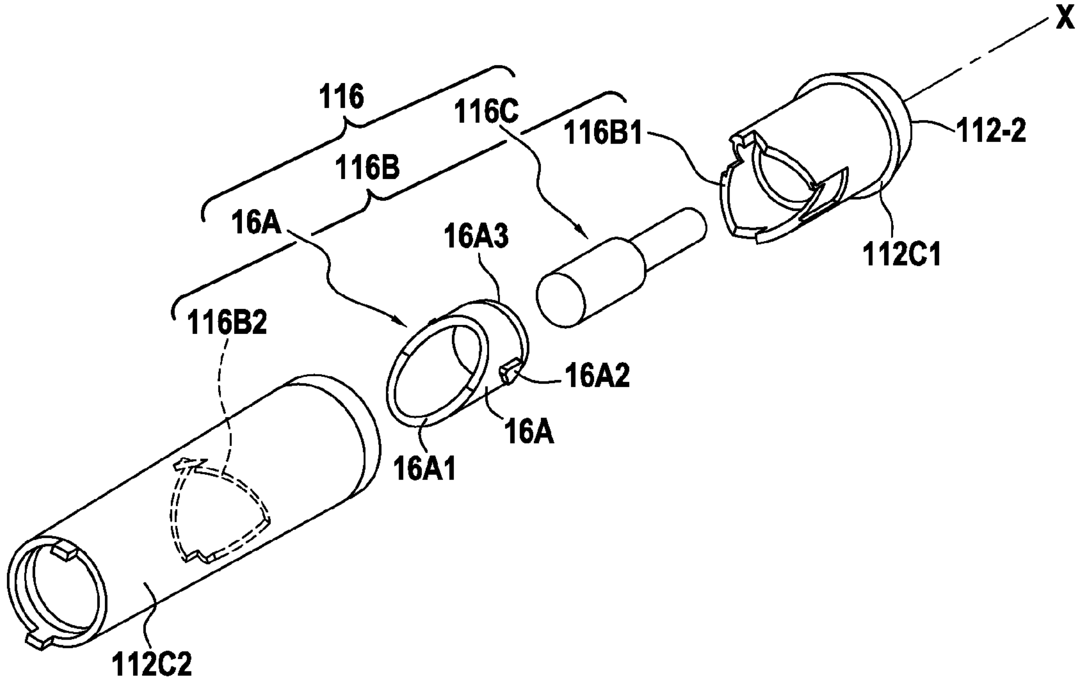
FIG. 6 shows an exploded view of a variant of the actuating mechanism.

FIG. 6 shows an exploded view of an actuating mechanism 116 according to a variant, which may replace the actuating mechanism 16. In this example, the actuating mechanism 116 may comprises a single ratchet mechanism. In other words, it does not comprise a blocking mechanism which is distinct from a protruding mechanism. In comparison with the variant of FIGS. 1 to 5, only the shape of the two opposite cam surfaces differ, there is no blocking mechanism, and the button 116C cooperates directly with the spinner 16A which may be, with the rest of the writing instrument, identical. In a variant, the button 116C may cooperate indirectly with the spinner 16A.

The actuating mechanism 116 may comprise a ratchet mechanism including only the (single) spinner 16A, the (single) ratchet 116B and the single button 116C.

The ratchet 116B may comprise two opposite helical cam surfaces 11661, 11662 axially sandwiching the at least one cam follower 16A2 of the spinner 16A. One of the two opposite helical cam surfaces 11661, 11662 may be provided on a first part 112C1 of the body, and the other of the two opposite helical cam surfaces 11661, 11662, may be provided on the second part 112C2 of the body.

Figure 7:
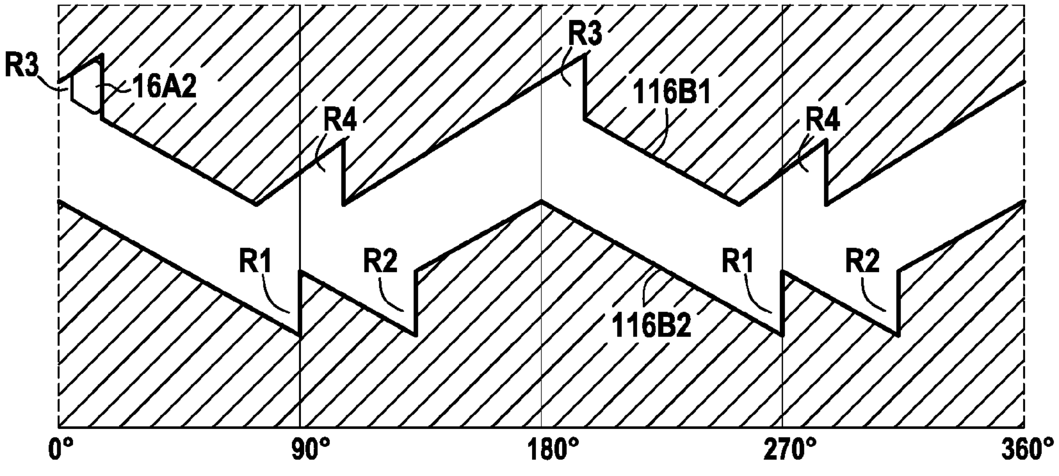
FIG. 7 shows a developed view of the two opposite helical cam surfaces of the ratchet of the variant of FIG. 6.

As shown in the developed view of FIG. 7 (only one cam follower 16A2 been shown), the ratchet 116B may be a combination of the ratchet 16B and of a traditional ratchet mechanism such as the ratchet mechanism 20. When the button 116C is pressed, the cam follower 16A2 axially abuts against the helical cam surface 11662, and rotates up to the recess R1 or R2. Depending on the angular position of the spinner 16A, the writing elements 14A, 14B are moved between their retracted position and their protruded position, one after the other. When the button 116C is released, due to the return springs 14A3, 1463, the cam follower 16A2 axially abuts against the helical cam surface 11661, and rotates up to the recess R4 or R3, respectively. Recesses R3 and R4 corresponds to rest positions. When the cam follower 16A2 is in the recesses R3, the writing elements 14A, 14B are both in their retracted position. When the cam follower 16A2 is in the recesses R4, one of the writing elements 14A, 14B is in the protruded position and the other of the writing elements 14A, 14B is in the retracted position, the writing instruments 14A, 14B being moved in examples, one after the other, in their protruded position.

Although the present disclosure is described with reference to specific examples, it is to be understood that these examples are merely illustrative of the principles and applications of the present disclosure. In particular, individual characteristics of the various embodiments shown and/or mentioned may be combined in additional embodiments. Consequently, the description and the drawings should be considered in a sense that is illustrative rather than restrictive.

Additionally, all of the disclosed features of an apparatus may be transposed, alone or in combination, to a method and vice versa.

It is intended that the specification and the examples be considered as exemplary only, with a true scope of the invention being indicated by the following claims.

The invention claimed is:

1. A multifunction writing instrument comprising a body extending along an axis and receiving at least two writing elements, each writing element comprising a writing tip and being movable between a protruded position in which the writing tip extends out of the body and a retracted position in which the writing tip is retracted within the body, and an actuating mechanism comprising a spinner configured to move one of the writing elements at a time one after the other from the retracted position to the protruded position, a ratchet receiving the spinner, and a single button configured to actuate the actuating mechanism, wherein the actuating mechanism comprises a protruding mechanism and a blocking mechanism which is distinct from the protruding mechanism, the protruding mechanism comprising the spinner and the ratchet, and wherein the blocking mechanism is functionally disposed between the single button and the protruding mechanism.

2. The multifunction writing instrument according to claim 1, wherein the actuating mechanism is configured to move each of the writing elements from the retracted position to the protruded position only if all the writing elements are in the retracted position.

3. The multifunction writing instrument according to claim 1, wherein the spinner comprises a distal end forming a helical cam surface configured to push one of the writing elements at a time one after the other from the retracted position to the protruded position.

4. The multifunction writing instrument according to claim 1, wherein the protruding mechanism is functionally disposed between the blocking mechanism and the writing elements.

5. The multifunction writing instrument according to claim 1, wherein the spinner is functionally connected to the blocking mechanism.

6. The multifunction writing instrument according to claim 1, wherein the blocking mechanism is a ratchet mechanism comprising a second spinner, a second ratchet receiving the second spinner, and a piston configured to be actuated by the single button.

7. The multifunction writing instrument according to claim 6, wherein the piston forms an input of the blocking mechanism from the single button and the second spinner forms an output of the blocking mechanism towards the protruding mechanism.

8. The multifunction writing instrument according to claim 6, wherein the spinner and the second spinner are configured to axially abut against each other.

9. The multifunction writing instrument according to claim 1, wherein the spinner comprises two cam followers diametrically opposed.

10. The multifunction writing instrument according to claim 1, wherein the ratchet comprises two opposite helical cam surfaces axially sandwiching at least one cam follower of the spinner.

11. The multifunction writing instrument according to claim 10, wherein the at least one cam follower has a trapezoidal shape.

12. The multifunction writing instrument according to claim 11, wherein two parallel sides of the trapezoidal shape extend axially, and two oblique sides of the trapezoidal shape respectively extend parallel to oblique portions of the two opposite helical cam surfaces.

13. The multifunction writing instrument according to claim 10, wherein the body comprises a first part and a second part, the first part includes one of the two opposite helical cam surfaces and the second part includes the other of the two opposite helical cam surfaces.

14. The multifunction writing instrument according to claim 1, wherein each of the writing elements comprises a return spring configured to push the writing element from the protruded position toward the retracted position, the return springs of the writing elements also serving as return springs for the actuating mechanism.

15. The multifunction writing instrument according to claim 1, further comprising a second spinner received in a second ratchet, wherein the spinner and the second spinner are configured to axially abut against each other.

16. The multifunction writing instrument according to claim 15, further comprising a piston configured to be actuated by the single button.

17. A multifunction writing instrument comprising a body extending along an axis and receiving at least two writing elements, each writing element comprising a writing tip and being movable between a protruded position in which the writing tip extends out of the body and a retracted position in which the writing tip is retracted within the body, and an actuating mechanism comprising a spinner configured to move one of the writing elements at a time one after the other from the retracted position to the protruded position, a ratchet receiving the spinner, and a single button configured to actuate the actuating mechanism, wherein the ratchet comprises two opposite helical cam surfaces axially sandwiching at least one cam follower of the spinner.

18. A multifunction writing instrument comprising a body extending along an axis and receiving at least two writing elements, each writing element comprising a writing tip and being movable between a protruded position in which the writing tip extends out of the body and a retracted position in which the writing tip is retracted within the body, and an actuating mechanism comprising a spinner configured to move one of the writing elements at a time one after the other from the retracted position to the protruded position, a ratchet receiving the spinner, and a single button configured to actuate the actuating mechanism, wherein the multifunction instrument further comprises a second spinner received in a second ratchet, and wherein the spinner and the second spinner are configured to axially abut against each other.

* * * * *